(12) United States Patent
Hiemer et al.

(10) Patent No.: US 10,358,135 B2
(45) Date of Patent: Jul. 23, 2019

(54) OPERATING METHOD FOR A VEHICLE DRIVE TRAIN OF A WORKING MACHINE INCLUDING A DRIVE MOTOR, A TRANSMISSION AND AN OUTPUT

(71) Applicant: ZF Friedrichshafen AG, Friedrichshafen (DE)

(72) Inventors: Marcus Hiemer, Meckenbeuren (DE); Jan-Frederik Kuhn, Friedrichshafen (DE); Stephan Schinacher, Egesheim (DE); Sven Bieber, Bermatingen (DE); Jürgen Legner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 113 days.

(21) Appl. No.: 15/405,371

(22) Filed: Jan. 13, 2017

(65) Prior Publication Data
US 2017/0203761 A1    Jul. 20, 2017

(30) Foreign Application Priority Data

Jan. 14, 2016    (DE) .......................... 10 2016 200 336

(51) Int. Cl.
*B60W 10/06*    (2006.01)
*B60W 30/188*    (2012.01)
(Continued)

(52) U.S. Cl.
CPC .. *B60W 30/1882* (2013.01); *B60W 30/18063* (2013.01); *F02D 29/02* (2013.01);
(Continued)

(58) Field of Classification Search
CPC ............... F16H 63/50; Y10T 477/6197; Y10T 477/623; Y10T 477/636; Y10T 477/68;
(Continued)

(56) References Cited

U.S. PATENT DOCUMENTS

| 4,663,990 A | * | 5/1987 | Itoh | .................... F16H 61/66259 |
| | | | | 477/43 |
| 5,545,105 A | * | 8/1996 | Roovers | ............ F16H 61/66254 |
| | | | | 477/43 |

(Continued)

FOREIGN PATENT DOCUMENTS

DE    10 2012 221 943 A1    6/2014

OTHER PUBLICATIONS

English translation of DE102012221943A1; translationportal.epo.org; Sep. 26, 2018 (Year: 2018).*

(Continued)

*Primary Examiner* — Roger L Pang
(74) *Attorney, Agent, or Firm* — Davis & Bujold PLLC; Michael J. Bujold (57) ABSTRACT

A method for the operation of a vehicle drive-train of a working machine having a drive motor, a transmission whose transmission ratio can be varied continuously, and a drive output. A rotational speed (nmot) of the drive motor can be varied by the driver, by the driver's actuation of a first control element (50), within a rotational speed range (53) delimited by an upper characteristic line (nmoto) and a lower characteristic line (nmotu). The characteristic lines (nmoto, nmotu) are functions of a reciprocal transmission ratio (irez) of the transmission. Furthermore, the rotational speed (nmot1) of the drive motor that can be set by the driver by way of the first control element (50), can be influenced by the driver's actuation of a second control element (51) and as a function of an operating condition of the working machine.

14 Claims, 5 Drawing Sheets

(51) Int. Cl.
  *F02D 29/02* (2006.01)
  *F02D 31/00* (2006.01)
  *F16H 63/50* (2006.01)
  *F02D 41/02* (2006.01)
  *B60W 30/18* (2012.01)
  *B60W 10/103* (2012.01)

(52) U.S. Cl.
  CPC ....... *F02D 31/001* (2013.01); *F02D 41/0225* (2013.01); *F16H 63/50* (2013.01); *B60W 10/06* (2013.01); *B60W 10/103* (2013.01); *B60W 2510/1005* (2013.01); *B60W 2540/10* (2013.01); *B60W 2710/0644* (2013.01); *F02D 2200/101* (2013.01); *F02D 2200/502* (2013.01); *F02D 2200/60* (2013.01); *F02D 2200/602* (2013.01); *F02D 2400/12* (2013.01); *Y10T 477/6197* (2015.01); *Y10T 477/623* (2015.01); *Y10T 477/636* (2015.01); *Y10T 477/68* (2015.01)

(58) Field of Classification Search
  CPC .............. B60W 10/103; B60W 10/06; B60W 30/1882; F02D 31/001; F02D 41/0225; F02D 2400/12; F02D 2200/60; F02D 2200/101; F02D 2200/602
  USPC .................. 701/55–58; 180/53.1, 53.6, 53.7
  See application file for complete search history.

(56) References Cited

U.S. PATENT DOCUMENTS

| | | | | |
|---|---|---|---|---|
| 5,688,204 A * | 11/1997 | Runge | ............... | F16H 61/66259 474/18 |
| 5,971,888 A * | 10/1999 | Goode | .................. | B60K 25/00 180/179 |
| 8,585,543 B1 | 11/2013 | Davis et al. | | |
| 9,969,402 B2 * | 5/2018 | Goli | ....................... | B60W 10/06 |
| 2016/0076462 A1* | 3/2016 | Hoff | ..................... | F02D 11/105 477/107 |
| 2018/0119807 A1* | 5/2018 | Dannerbauer | ........ | B60W 10/06 |

OTHER PUBLICATIONS

German Search Report corresponding to 10 2016 200 336.4 dated Oct. 17, 2016.

* cited by examiner

OPERATING METHOD FOR A VEHICLE DRIVE TRAIN OF A WORKING MACHINE INCLUDING A DRIVE MOTOR, A TRANSMISSION AND AN OUTPUT

This application claims priority from German patent application serial no. 10 2016 200 336.4 filed Jan. 14, 2016.

FIELD OF THE INVENTION

The invention concerns a method for operating a vehicle drive-train of a working machine, having a drive motor, a transmission with a transmission ratio that is continuously variable and a drive output.

BACKGROUND OF THE INVENTION

U.S. Pat. No. 8,585,543 B1 describes a system and a method for controlling the speed of a working machine, which comprises a continuous transmission, namely a so-termed CVT (continuously variable transmission) which is functionally connected to a drive source. Associated with the CVT are a number of selectable virtual gear steps. The working machine comprises a machine operator's input device which can produce a machine operator's input signal that specifies a desired setting of the basic speed of the working machine. The machine operator's input signal can be converted to a CVT rotational speed command and to a drive source rotational speed command, which are sent to the CVT transmission and the drive source respectively. The CVT transmission adjusts the machine's speed in accordance with the CVT rotational speed command while the drive source adjusts its rotational speed in accordance with the drive source rotational speed command, so that the operation of the drive source is essentially independent of the operation of the CVT transmission.

With appropriate design of such a CVT transmission, in the area of the CVT transmission a so-termed infinite transmission ratio can be obtained, in order to be able to operate a drive motor of a vehicle drive-train in the form of an internal combustion engine without having to decouple it to the usual extent from the drive output of the vehicle drive-train by means of a shifting element or the like. This means that if an infinite transmission ratio is set in the area of a CVT transmission, the drive output rotational speed can be regulated to 0 revolutions/minute while at the same time the drive motor is still rotating. If in the area of a CVT transmission this so-termed infinite transmission ratio is set, the traction force needed for a working machine can be produced with a rotational speed and a torque of the drive motor which are lower than the maximum motor rotational speed and the maximum torque that can be produced by the drive motor.

Following the general tendency to keep the fuel consumption of working machines as low as possible, it is therefore logical when obtaining very high transmission ratios close to the infinite transmission ratio, to reduce the rotational speed of the drive motor without thereby compromising the working performance of the working machine. In general, if the rotational speed level of the drive motor is reduced at the same time that a high transmission ratio is set in the area of a CVT transmission in order to reduce the fuel consumption, then during unfavorable variations of the operating condition of a working machine, during which a driver only calls for a low vehicle speed but by virtue of a working hydraulic system the working machine is trying to generate a lot of power, in some circumstances the drive motor cannot produce sufficient drive power for this. In order by means of the drive motor to make sufficient drive power available for this, the drive motor must be operated at a correspondingly high rotational speed, but this cannot be done to the extent desired by the procedures known until now.

SUMMARY OF THE INVENTION

Accordingly, the purpose of the present invention is to provide a method by means of which a motor rotational speed can be set in a transmission-ratio-dependent manner and in addition, during operating condition variations characterized by a high power demand on the drive motor, to be able to obtain sufficiently high rotational speeds of the drive motor with little control and regulation effort.

According to the invention, this objective is achieved by a method having the characteristics described below.

By virtue of the method according to the invention for operating a vehicle drive-train of a working machine having a drive motor, a transmission whose transmission ratio can be varied continuously, and a drive output, a rotational speed of the drive motor can be varied by means of a control element that can be operated by the driver, within a rotational speed range delimited by an upper characteristic line and a lower characteristic line.

According to the invention, the characteristic lines depend on the reciprocal transmission ratio of the transmission, and the rotational speed of the drive motor that can be set by the driver by means of the control element can be influenced if the driver actuates a further control element, and also as a function of an operating condition of the working machine.

The procedure according to the invention is based on the knowledge that a requirement for the lowest possible rotational speed of the drive motor in order to achieve operation that favors a low consumption at the same time as good performance can be realized with little effort, if the limits of the rotational speed level of the rotational speed of the drive motor are established as a function of the reciprocal transmission ratio of the transmission. In particular, by means of the procedure according to the invention, at low values of the reciprocal transmission ratio of the transmission initially low overall rotational speed values of the rotational speed of the drive motor can be obtained when the drive motor is not heavily loaded by loads on the drive output side.

Between the upper limit of the rotational speed of the drive motor that depends on the reciprocal transmission ratio of the transmission and the lower limit of the rotational speed of the drive motor that also depends on the reciprocal transmission ratio of the transmission, the rotational speed of the drive motor is scaled as a function of the actuation of the control element, which for example can be an accelerator pedal of the working machine. The rotational speed of the drive motor so set, and which depends on the reciprocal transmission ratio of the drive motor, can be increased if the driver actuates the further control element, which can for example be a so-termed inching pedal, in order to be able to produce a desired drive power of the drive motor.

In general, in the present context the characteristic lines that delimit the rotational speed range depend on the reciprocal transmission ratio of the transmission, since while the vehicle is at rest the transmission ratio of the transmission in the area of a CVT transmission while at the same time the drive motor is switched on and is rotating, has to be adjusted toward infinity if the vehicle drive-train is closed by closing the reversing and range clutches but if, for example, a hydrostatic pump of a hydrostat of a CVT transmission is not yet switched off. During such an operating condition of a vehicle drive-train the rotational speed of the drive output is essentially equal to zero, whereas the drive motor is being operated at its nominal rotational speed. The resulting transmission ratio of the CVT transmission, which corresponds to the quotient of the rotational speed of the drive motor and the drive output rotational speed, moves in a mathematical sense toward infinity. Since for numerical reasons such a transmission ratio value does not represent any suitable magnitude on the basis of which the control and regulation of a vehicle drive-train could be carried out, continuous transmissions are often operated using the reciprocal transmission ratio of a CVT transmission which corresponds to the quotient of the drive output rotational speed and the rotational speed of the drive motor and is essentially equal to zero when the vehicle is at rest while at the same time the drive motor is rotating.

By virtue of the characteristic lines that according to the invention are dependent upon the reciprocal transmission ratio of the transmission, when the reciprocal transmission ratios are small the drive motor can be operated at low rotational speeds in a manner that favors low consumption when the vehicle is at rest, in such a way that owing to the infinite transmission ratio, despite the operating mode that favors low consumption, the full traction force can be obtained for driving the vehicle. In addition, the further control element provides the possibility of influencing or correspondingly increasing the rotational speed of the drive motor if the driver correspondingly actuates the further control element and also as a function of an operating condition of a working machine, in order, while the vehicle is at rest or nearly at rest, to be able to provide a required power output from the drive motor with little control and regulation effort, and also in order to be able to supply the working hydraulic system of the working machine with the necessary power.

The additional influencing of the rotational speed of the drive motor that can be set by the driver using the control element in a manner that depends on the operating condition of the working machine, also offers the possibility of reducing the control and regulating effort, since the influencing of the rotational speed of the drive motor that can be set by the driver using the control element can be varied if the driver actuates the further control element, for example as a function of the currently existing drive output rotational speed or other operating parameters of the vehicle drive-train.

In a variant of the method according to the invention that can also be carried out with little control and regulation effort, the upper characteristic line can be varied if the driver actuates the further control element and as a function of the operating condition of the working machine.

If, depending on the actuation of the further control element, a rotational speed value is selected from a characteristic line, which value, depending on the operating condition of the working machine, is multiplied by a weighting factor which, depending on the operating condition of the working machine, varies between 0 and 1, such that the upper characteristic line is influenced as a function of the weighted rotational speed value, the characteristic of the control element is changed in accordance with the situation and in each case the power demanded by the driver is made available while also operating the drive motor in as low-consumption a manner as possible.

In a variant of the method according to the invention that deviates from the above, the rotational speed of the drive motor selected as a function of the actuation of the control element can be varied if the driver actuates the further control element and also as a function of the operating condition of the working machine, in order on the one hand to be able to provide a required power output from the drive motor and on the other hand to keep the fuel consumption as low as possible.

The drive motor can be operated with little control and regulation effort and in as low-consumption a manner as possible while providing a power output required at the time, if as a function of the actuation of the further control element a rotational speed value is selected from a characteristic line, which value is multiplied by a weighting factor that varies as a function of the operating condition of the working machine between 0 and 1, and is then added to the rotational speed of the drive motor selected as a function of the driver's actuation of the control element.

In this case, in a variant of the method according to the invention that is simple to implement, the weighting factor increases with increasing actuation of the control element while at the same time the value of the rotational speed of the drive output rotational speed is low, whereas with increasing value of the drive output rotational speed the weighting factor decreases.

If the weighting factor decreases with increasing reciprocal transmission ratio of the transmission, the influence of the driver's actuation of the further control element with increasing drive output rotational speed is reduced.

In a variant of the method according to the invention that can also be carried out with little effort, the weighting factor decreases with increasing swivel angle of a hydraulic adjustment unit of a hydrostatic variator of the transmission, in the area of which the transmission ratio of the transmission can be varied continuously, and a consequently increasing displacement volume of the adjustment unit that can be operated as a motor.

If the weighting factor increases with increasing pressure difference between a high-pressure and a low-pressure side of a hydraulic adjustment unit of a hydrostatic variator of the transmission, in the area of which the transmission ratio of the transmission can be varied continuously, then in a simple manner the influencing of the rotational speed of the drive motor called for by the driver by way of the further control element can be taken into account to a greater extent with increasing loading of the transmission.

If the rotational speed of the drive motor selected as a function of the actuation of the control element and the further control element, and also of the operating condition of the working machine, can be varied as a function of a driver's actuation of an additional control element, the rotational speed of the drive motor selected as a function of the driver's actuation of the control element, the driver's actuation of the further control element and as a function of the operating condition of the working machine can be adapted by the driver to the current operating point of a working machine with little actuating effort and within short operating times, as a function of the operating condition variation existing at the time.

If a rotational speed value is selected as a function of the actuation of the additional control element, which is added to the rotational speed determined as a function of the actuation of the control element and the further control element and also of the operating condition of the working machine, the rotational speed of the drive motor can be increased or reduced when the driver actuates the additional control element, depending on the situation, with little effort and within a short time and with little control and regulation complexity.

In contrast, if as a function of the actuation of the additional control element a rotational speed value is selected and, in each case, the maximum rotational speed value selected from the rotational speed value selected as a function of the actuation of the additional control element and the rotational speed of the drive motor determined as a function of the actuation of the control element and the further control element and also of the operating condition of the working machine is determined, such that the maximum corresponds in each case to the rotational speed value of the rotational speed of the drive motor determined as a function of the actuation of the additional control element, the rotational speed of the drive motor is in turn adapted in a simple manner to the operating point of a drive motor at the time and can be specified or adjusted within short operating times and with little actuating effort by the driver.

In order to avoid unacceptably high loads in the area of the transmission, in a variant of the method according to the invention that can be carried out simply the rotational speed of the drive motor determined at the time as a function of the actuation of the additional control element is limited to a maximum permissible value of the input rotational speed of the transmission.

Both the characteristics indicated in the claims and also those defined in the following example embodiments of the object of the invention are in each case suitable, whether taken in isolation or in any desired combination with one another, as further developments of the object according to the invention.

Further advantages and advantageous features of the object of the invention emerge from the claims and from the example embodiments whose principle is described below with reference to the drawings, wherein, in the description of the various example embodiments, for the sake of clarity the same indexes are used for the same or functionally equivalent components.

DETAILED DESCRIPTION OF THE PREFERRED EMBODIMENTS

Figure 1:
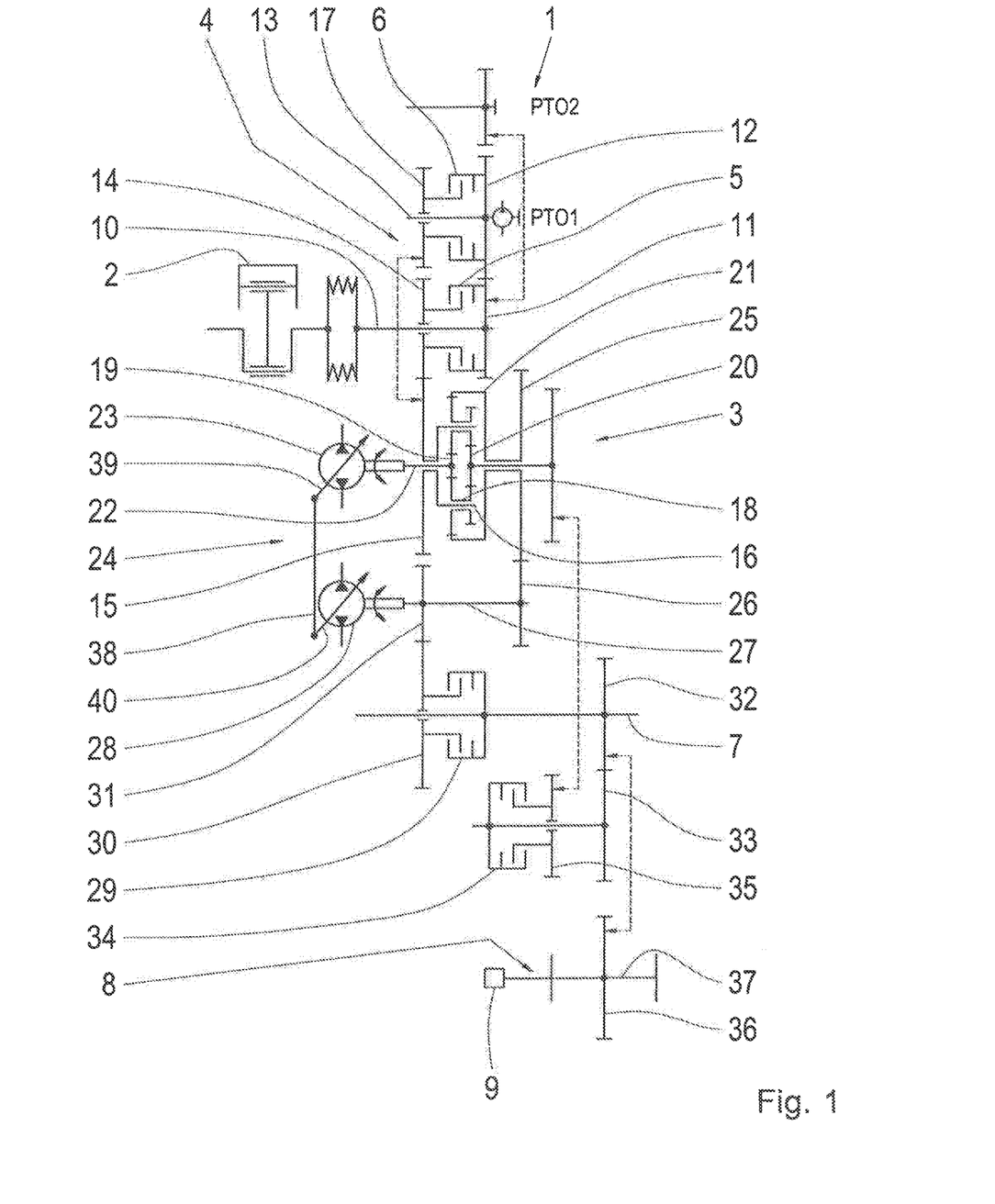
FIG. 1: A schematic representation of a drive-train of a working machine having a drive motor, with a continuously variable power-split automatic transmission and with a drive output.

FIG. 1 shows a schematic representation of a vehicle drive-train 1 comprising a drive motor 2 and a continuously variable, power-split automatic transmission 3 that can be coupled thereto. In the present case the drive motor 2 is in the form of an internal combustion engine, preferably a Diesel engine, and in other embodiments the vehicle drive-train 1 can be in the form of an electric machine or a combination of an internal combustion engine of any type with an electric machine.

Between the drive motor 2 and the transmission or automatic transmission 3 in this case a reversing transmission 4 is provided, which comprises two frictional shifting elements 5, 6 each designed as a travel direction clutch. Thus, a drive input rotational movement of the drive motor 2 when the frictional shifting element 5 is closed, is passed on to the transmission 3 with a rotational direction such that a working machine built with the drive-train 1 is propelled in the forward travel direction. In contrast, if the frictional shifting element 6 is closed and at the same time the frictional shifting element 5 is open, the opposite drive input rotational direction of the drive motor 2 is passed on to the transmission 3 and a working machine built with the drive-train 1 is propelled in the reverse travel direction.

A shaft 7 of the transmission 3 is functionally connected to a drive output 8 of the vehicle drive-train 1, by way of which a drivable vehicle axle 9 can be acted upon by a torque. In the area of the continuously variable power-split transmission 3 a number of transmission ratio ranges can be engaged, within which in turn the transmission ratio of the transmission 3 can be varied continuously by adjusting a variator. The transmission 3 can be designed both as a continuously variable power-split transmission with primary coupling, and as one with secondary coupling.

Instead of the reversing transmission 4, in the area between the drive motor 2 and the transmission 3 the vehicle drive-train 1 can also be made with a conventional starting element such as a frictional starting clutch, and in that case if travelling in reverse is sometimes desired it can be obtained, for example, in the area of a separate transmission ratio step of the transmission 3 for travelling in reverse.

Regardless of whether the vehicle drive-train 1 is made with the reversing transmission 4 or with an individual frictional starting clutch, a power flow between the drive motor 2 and the drive output 8 can be produced in the area of the frictional shifting element 5 or the frictional shifting element 6 or in the area of a frictional starting clutch by appropriate adjustment of the transmission capacity of one of those shifting elements. When starting of the vehicle is required, in the area of the transmission 3 a starting transmission ratio is engaged and a drive torque is passed on from the drive motor 2 in appropriately converted form toward the drive output 8 or drivable vehicle axle 9 by way of the transmission 3, as soon as the power flow has been at least partially established.

A transmission input shaft 10 of the transmission 3 is connected in a rotationally fixed manner to the drive motor 2. By way of a fixed wheel 11 and a fixed wheel 12 the transmission input shaft 10 powers an auxiliary power takeoff 13 and the first shifting element halves of the frictional shifting elements 5 and 6. The frictional shifting element 5 is arranged coaxially with the transmission input shaft 10, whereas the frictional shifting element 6, or travel direction clutch for driving in reverse, is positioned on the shaft of the power takeoff 13 which is arranged coaxially with the transmission input shaft 10. In the closed operating condition of the frictional shifting element 5 or travel direction clutch for forward driving, by way of a loose wheel 14 mounted to rotate on the transmission input shaft 10, the transmission input shaft 10 drives a loose wheel 15 which is connected to a planetary carrier 16 in a rotationally fixed manner. In the closed condition of the frictional shifting element 6, the transmission input shaft 10 drives the loose wheel 15 by way of a loose wheel 17.

On the planetary carrier 16 are mounted to rotate a plurality of double planetary gearwheels 18. The double planetary gearwheels 18 mesh with a first sun gear 19 and a second sun gear 20 as well as with a ring gear 21. The first sun gear 19 is connected in a rotationally fixed manner to a shaft 22 of a first hydraulic machine 23 of a hydrostatic unit 24. The ring gear 21 is functionally connected by way of a fixed wheel 25 and a fixed wheel 26 to a shaft 27 of a second hydraulic machine 28 of the hydrostatic unit 24.

The shaft 7 of the transmission 3 can be connected by means of a frictional shifting element 29 arranged coaxially with the shaft 7 for the first transmission ratio range of the transmission 3, a loose wheel 30 and a fixed wheel 31, to the second shaft 27 of the hydrostatic unit 24. Furthermore, the shaft 7 can be coupled to the second sun gear 20 by way of a fixed wheel 32, a fixed wheel 33 and a further frictional shifting element 34 for the second transmission ratio range of the transmission 3, and also by way of a loose wheel 35 and a fixed wheel 36. The fixed wheel 36 is arranged coaxially with the second sun gear 20, whereas the fixed wheel 33, the frictional shifting element 34 for the second driving range and the loose wheel 35 are arranged coaxially with one another. The fixed wheel 32, the frictional shifting element 29 for the first driving range and the loose wheel 30 are again positioned coaxially with the shaft 7. In addition, the fixed wheel 32 meshes both with the fixed wheel 33 and with a fixed wheel 36 of a transmission output shaft 37, which in turn can be connected to the drivable vehicle axle 9 or to a number of drivable axles 9 of the vehicle drive-train 1.

Figure 2:
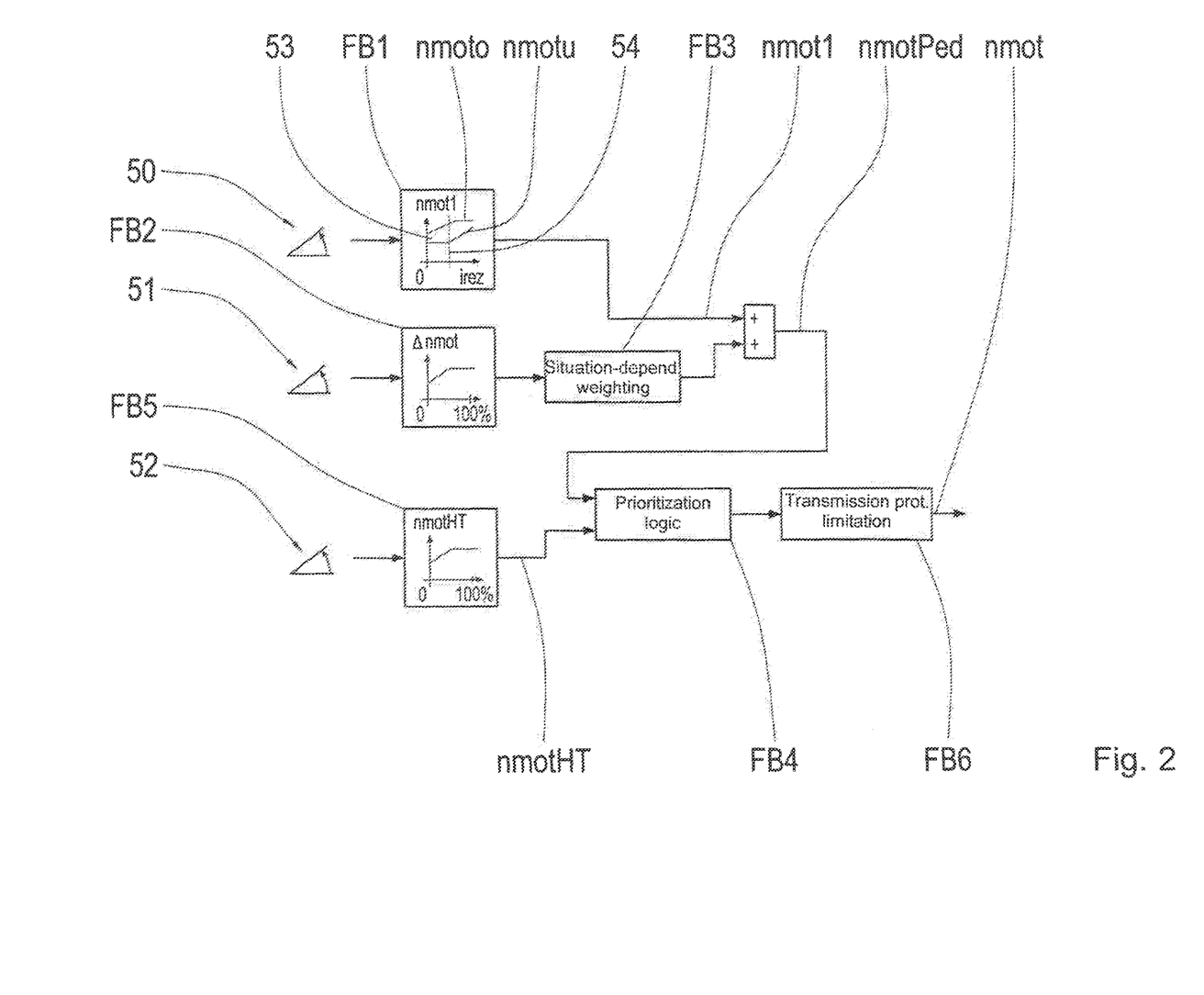
FIG. 2: A schematic representation of the sequence of one variant of the method according to the invention.

The travel direction clutches 5 and 6 are in this case designed as wet clutches, which are provided not only in order to establish the power flow between the drive motor 2 and the drive output 8, but at the same time, as described earlier, in order to determine the travel direction. In accordance with their capacitative design, the frictional shifting elements 5 and 6 of the vehicle drive-train 1, as illustrated in FIG. 2, can also be used as starting elements. This is the case when, starting from a neutral operating condition of the transmission 3 in which the shifting elements 29 and 34 are open, a driver engages a travel direction and at the same time actuates an accelerator pedal to indicate a wish for a certain speed. In the present case the frictional shifting elements 5 and 6 are designed such that by means of them, a travel direction change or a so-termed reversing process can be carried out even from higher driving speeds in the forward or reverse travel direction.

During such a reversing process, a vehicle speed is first reduced from the vehicle speed at the time toward zero, and for this the transmission capacities of both the frictional shifting element 5 and the frictional shifting element 6 are adjusted by appropriate amounts. During the reversing process the two frictional shifting elements 5 and 6 are mainly operated in a slipping condition. When the vehicle speed is essentially equal to zero, the transmission capacities of the two shifting elements 5 and 6 are adjusted in such manner that the vehicle begins moving in the direction opposite to the previous travel direction until the desired vehicle speed has been reached.

To be able to carry out a starting process, from when the vehicle is at rest and the transmission 3 is its neutral operating condition, within short operating times and essentially without delay, the shifting element 29 of the first transmission ratio range of the transmission 3 is closed and, in addition, the shifting element 5 or the shifting element 6 is changed to its closed operating condition, depending on the driver's wish at the time to travel forward or in reverse. During the engagement of the shifting element 29 and the shifting element 5 or 6, the hydraulic machines 23 and 28 are adjusted by means of a movable yoke 38 in such manner that in the area of the transmission 3 the desired starting transmission ratio is engaged. During this, the transmission capacity of the frictional shifting element 5 or 6 is set to values greater than zero during the engagement of the starting transmission ratio of the transmission 3, in order to be able to set in motion a working machine made with the vehicle drive-train according to FIG. 1, or vehicle, already during the closing process of the frictional shifting element 5 or 6.

During such a starting process of the vehicle drive-train 1, the drive-train is operating in traction with the first hydraulic machine 23 working as a pump and the second hydraulic machine 28 as a motor. By actuating the yoke 38 in a manner to be described in more detail below, axes 39, 40 of the hydraulic machines 23 and 28 are adjusted in order to accelerate the vehicle built with the drive-train 1, in such manner that the transmission ratio of the transmission 3 is reduced and a drive output speed increases. With increasing swivel angle of the axes 39, 40 toward a maximum swivel angle, which in the present case is approximately 44°, and if the driver persists in his wish for further acceleration of the vehicle, i.e. for a further increase of the vehicle speed, then for a further continuous change of the transmission ratio of the transmission 3 the second transmission ratio range must be engaged in the area of the transmission 3. For this, the shifting element 29 has to be disengaged and the further frictional shifting element 34 has to be changed to its closed operating condition. At a defined swivel angle of the axes 39 and 40, the frictional shifting elements 29 and 34 are essentially at the same time in a synchronous operating condition, so that the change between the first transmission ratio range and the second transmission ratio range can be carried out essentially without interruption of traction force.

If in the transmission 3 the second transmission ratio range is engaged, in which the frictional shifting element 34 is closed and the frictional shifting element 29 is open, the first hydraulic machine 23 operates as a motor and the second hydraulic machine 28 as a pump. The two axes 39 and 40 of the hydraulic machines 23 and 28 are swiveled back together by means of the yoke 38 starting from their current swivel angle, i.e. the maximum swivel angle, toward their initial position at the beginning of the starting process, so that by this swiveling of the hydrostatic unit 34 the complete extent of the second transmission range is traversed. As a result, the speed of the vehicle built with the vehicle drive-train 1 increases further until the maximum vehicle speed is reached.

FIG. 2 shows a schematic representation of a sequence of a first variant of a method for operating a vehicle drive-train 1, by means of which, in a function block FB1, a rotational speed nmot of the drive motor or drive device 2 can first be varied within a rotational speed range 53 when the driver actuates a first control element 50. In this case the rotational speed range 53 is delimited by an upper characteristic line nmoto and by a lower characteristic line nmotu. The characteristic lines nmoto and nmotu are functions of a reciprocal transmission ratio irez of the transmission 3, which corresponds to the quotient of the value of the rotational speed of the drive output 8 and the value of the rotational speed nmot of the drive motor 2.

In this case the upper characteristic line nmoto increases, starting from a rotational speed value that corresponds to a reciprocal transmission ratio of the transmission 3 equal to zero, linearly with the reciprocal transmission ratio irez up to a defined value of the rotational speed nmot of the drive motor 2. With further increase of the reciprocal transmission ratio irez the upper characteristic line nmoto remains at a constant value. The rotational speed value nmot of the constant section of the upper limit line nmoto corresponds in this case to a maximum rotational speed value of the rotational speed nmot of the drive motor 2, with which the transmission 3 can at most be operated without generating unacceptably high loads in the area of the transmission 3.

The vertical line 54 corresponds to the value of the reciprocal transmission ratio irez of the transmission 3, at which the range change from the first transmission range toward the second transmission range, or from the second transmission range toward the first transmission range, takes place in the transmission 3.

The first control element 50 corresponds in this case to an accelerator pedal, by means of which a rotational speed nmot1 of the drive motor 2 is first scaled between the irez-dependent upper characteristic line nmoto and the also irez-dependent lower characteristic line nmotu, in the first function block FB1. Here the possibility exists of determining the rotational speed nmot1 as a function of the current actuation by the driver of the first control element 50 at the time, in accordance with the relationship expressed by the following equation:

$$nmot1 = nmotu + \%FP*(nmoto - nmotu)$$

In this case, the rotational speed values to be inserted respectively in the above relationship in place of the variables nmotu and nmoto are determined by means of the upper characteristic line nmoto and the lower characteristic line nmotu as a function of the currently existing reciprocal transmission ratio irez of the transmission 3. The variable % FP corresponds to the percentage actuation of the first control element 50 or accelerator pedal, which can be actuated by a driver continuously through a defined travel range between 0 and 100%. The rotational speed nmot1 of the drive motor 2 so determined, which is a function of the reciprocal transmission ratio irez of the transmission 3, can in this case be increased as a function of a driver's actuation of a second control element 51, which is in this case a so-termed inching pedal.

For this, depending on a position of the second control element 51, in a second function block FB2 a so-termed motor rotational speed increase value Δnmot is determined by means of a corresponding characteristic line. Again, starting at a rotational speed value that corresponds to a non-actuated condition of the second control element 51, the characteristic line of the motor rotational speed increase value Δnmot rises to a defined rotational speed value and then remains at a constant level. The motor rotational speed increase value Δnmot determined from the characteristic line is first weighted in a third function block FB3 as a function of the currently existing driving situation. Here, the weighting factor for the situation-dependent weighting in the third function block FB3, which factor adopts values between 0 and 1, is high when the first control element 50 or accelerator pedal is firmly depressed and the rotational speed of the drive output 8 is low. In contrast, the rotational speed nmot 1 of the drive motor 2 is only increased by the motor rotational speed increase value Δnmot slightly if indeed at all, when the rotational speed of the drive output 8 is high, since the use of a working hydraulic system of a working machine built with the vehicle drive-train 1 at high rotational speeds, or high values of the rotational speed of the drive output 8, is rather unlikely.

The situation-dependent weighting of the motor rotational speed increase value Δnmot implemented in the third function block FB3 can also be carried out, depending on the application concerned, on the basis of the transmission ratio of the transmission 3 or as a function of the swivel angle of the hydrostatic unit 24. Alternatively, it is also possible to carry out the situation-dependent weighting of the third function block FB3 with the help of a pressure difference between the high-pressure side and the low-pressure side in the area of the hydrostatic unit 24, since this provides information about the current load condition of the transmission.

The motor rotational speed increase value Δnmot weighted in the area of the third function block FB3 and the rotational speed nmot1 determined as a function of the actuation of the first control element 50 in the first function block FB1 are added together, the sum of the two corresponding to a further rotational speed nmotPed of the drive motor 2 which is used as an input value for a fourth function block FB4, in which a prioritizing logic is implemented.

Depending on the driver's actuation of a third control element 52, which in this case is a hand-held gas device that can be actuated continuously over a defined travel range between 0 and 100%, in a fifth function block FB5 a further rotational speed nmotHT of the drive motor 2 is determined and also transmitted to the fourth function block FB4 as an input value.

In the present case, by virtue of the prioritization logic of the fourth function block FB4 the maximum of the values of the rotational speeds nmotPed and nmotHT is determined and then transmitted as the input value for a sixth function block FB6, in the area of which a transmission protection limitation is carried out. In this case, the maximum of the rotational speed values nmotPed and nmotHT determined by the prioritization logic of the fourth function block FB4 is limited to a maximum value of the transmission input rotational speed of the transmission 3, in order to avoid loads in the area of the transmission 3 as a result of unacceptably high rotational speeds, which loads could sometimes permanently damage the function of the transmission 3. The output value of the sixth function block FB6 is ultimately the rated value of the rotational speed nmot of the drive motor 2, as a function of which the drive motor 2 is operated in a controlled and/or regulated manner.

Alternatively to the determination of the maximum of the rotational speeds nmotPed and nmotHT described above, the possibility also exists that the rotational speed nmotPed in the area of the prioritization logic in the fourth function block is set equal to the value of the rotational speed nmotHT or if necessary increased. Again as an alternative to this, there is also the possibility that the rotational speed nmotPed determined by the two control elements 50 and 51 is prioritized by the driver's actuation of the third control element 52, if the use of a working hydraulic system of the working machine is unlikely.

Figure 3:
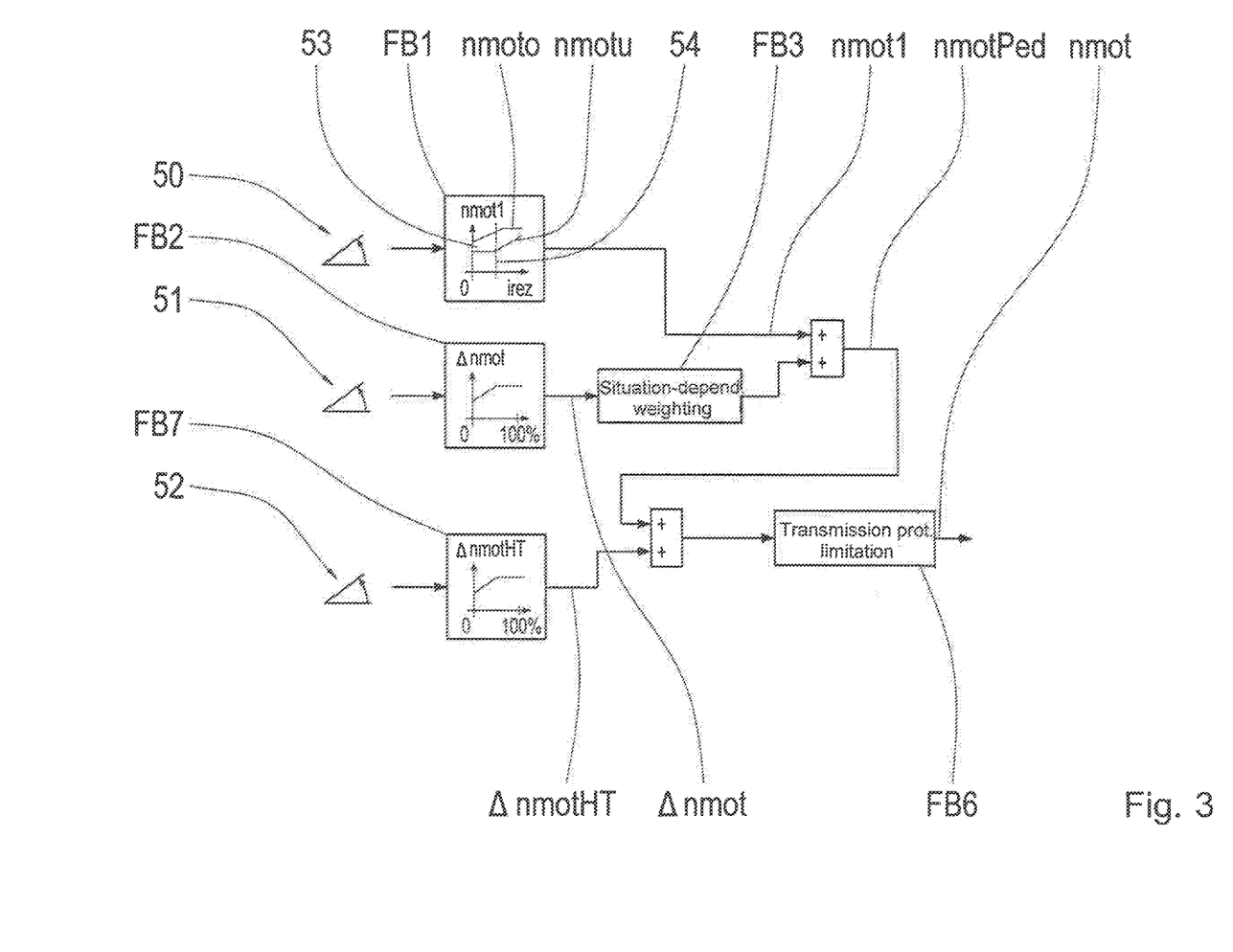
FIG. 3: A schematic representation of the sequence of another variant of the method according to the invention.

FIG. 3 shows a representation corresponding to FIG. 2, with a further variant of the method according to the invention in which the rotational speed nmotPed is determined to the same extent as in the variant of FIG. 2, as a function of a driver's actuation of the first control element 50 and the second control element 51, in the function blocks FB1 to FB3. The difference is that in the variant according to FIG. 3 the rotational speed nmotPed is adapted by virtue of a rotational speed value ΔnmotHT determined as a function of a driver's actuation of the third control element 52 in the area of a seventh function block FB7, in the manner described in more detail below. In this case the second variant of the method according to the invention, shown in FIG. 3, comprises the seventh function block FB7 in place of the fifth function block FB5 of the first variant according to FIG. 2.

In the present case the course of the rotational speed change value ΔnmotHT has values smaller than 0 so long as the third control element 52 is actuated to between 0 and 50% of its travel range. With increasing actuation by the driver of the third control element 52, the rotational speed change value ΔnmotHT assumes positive values. The rotational speed change value ΔnmotHT determined in the seventh function block FB7 is added to the rotational speed nmotPed determined from the function blocks FB1 to Fb3, and the sum is again sent as the input value to the sixth function block FB6 as a transmission protection limitation in order to prevent unacceptably high loads in the area of the transmission 3.

The second variant according to FIG. 3 has the advantage that the rotational speed nmotPed can be increased or reduced by a driver's corresponding actuation of the third control element 52, and the rated value of the rotational speed of the drive motor 2 can be determined without the above-described prioritization logic of the fourth function block FB4 of the first variant of the method according to the invention.

FIG. 4 again shows a representation corresponding to FIG. 2, of a third variant of the method according to the invention, in which; as a function of the driver's actuation of the second control element 51, only the upper characteristic line nmoto obtained from an eighth function block FB8 is influenced as a function of the rotational speed value Δnmot determined in the area of the second function block FB2 and weighted in the area of the third function block FB3, whereby the characteristic of the first control element 50 can be varied. Thereafter, the rotational speed nmot1 is determined by appropriate actuation of the first control element 50 in the manner described in connection with FIG. 2 in the first function block FB1 as a function of the influenced upper characteristic line nmoto and the fixedly specified lower characteristic line nmotu, and the sum of the rotational speed nmot1 of the drive motor 2 and rotational speed change value ΔnmotHT selected as a function of the driver's actuation of the third control element 52 in the seventh function block FB7 is formed. For this, the rotational speed change value ΔnmotHT is determined as described in relation to FIG. 3, in the area of the seventh function block FB7. Then, the summed value is restricted by the transmission protection limitation of the sixth function block FB6 to a rotational speed range in which no transmission damage can take place.

Figure 4:
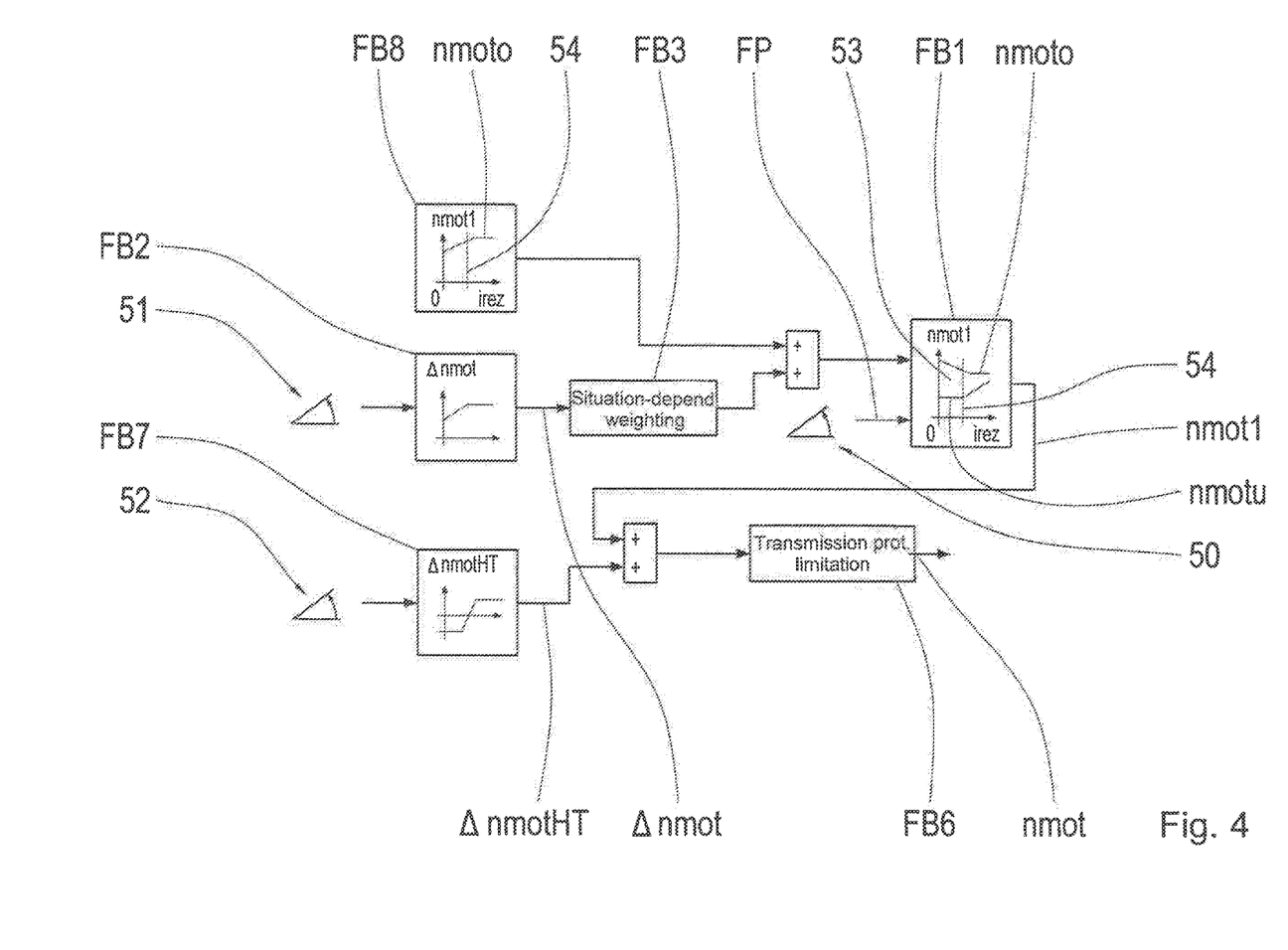
FIG. 4: 2: A schematic representation of the sequence of a further variant of the method according to the invention.
Figure 5:
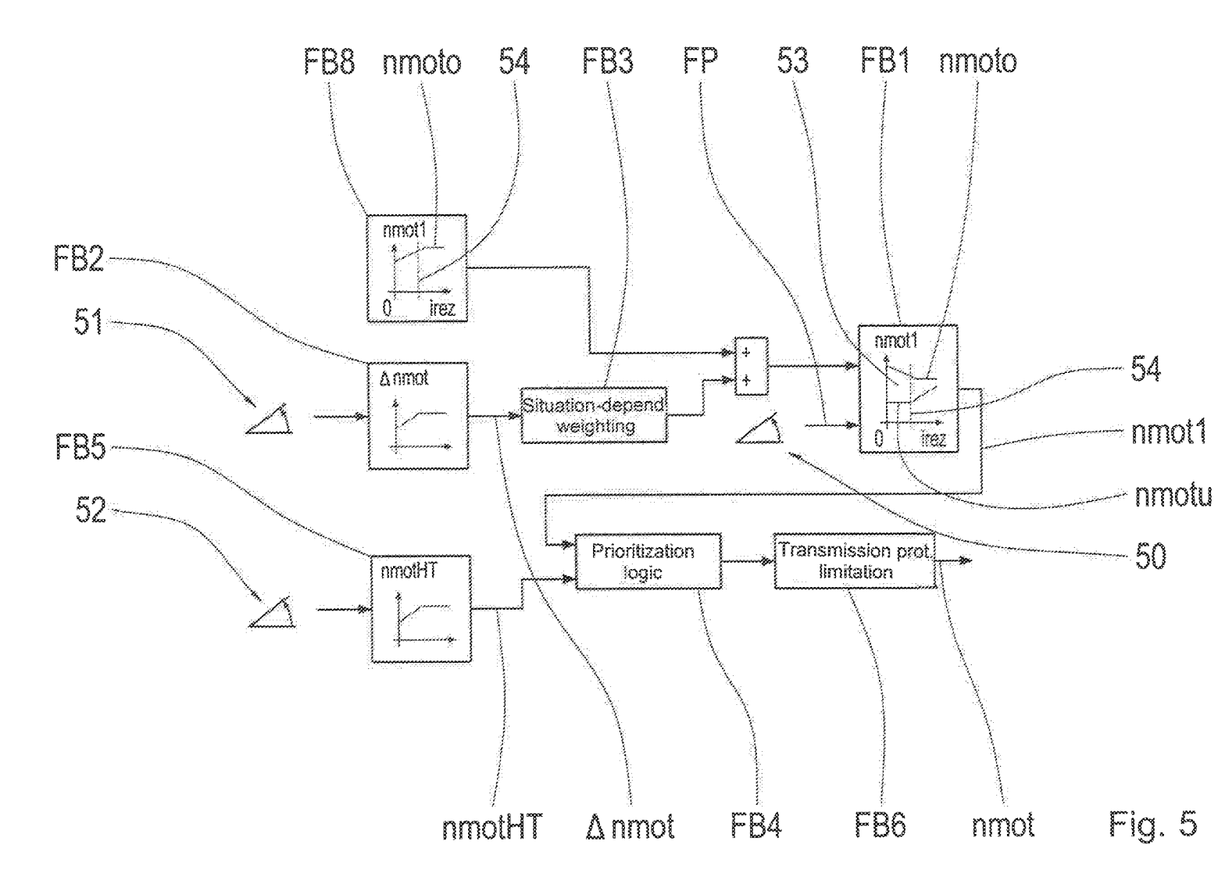
FIG. 5: A schematic representation of the sequence of yet another variant of the method according to the invention.

In addition FIG. 5 shows a representation corresponding to FIG. 2, which is a schematic representation of the sequence of a fourth variant of the method according to the invention that combines the variants described in relation to FIGS. 4 and 2. In this case the rotational speed nmot1 is determined to the extent corresponding to FIG. 4 and is then sent as an input value for the prioritization logic of the fourth function block FB4 described in more detail in connection with FIG. 2, to which function block the rotational speed nmotHT determined in the fifth function block FB5 is additionally sent as a further input value.

The rotational speed determined by way of the prioritization logic of the fourth function block FB4 is limited in the area of the transmission protection limitation of the sixth function block FB6 in order to avoid transmission damage, in case the rotational speed value determined in the area of the prioritization logic in the fourth function block FB4 is too high. The output value of the sixth function bock FB6 again represents the rated value of the motor rotational speed nmot of the drive motor 2.

Depending on the application concerned, during the course of the second and during the course of the third variants of the method according to the invention the upper characteristic line nmoto can be adjusted by virtue of the driver's actuation of the second control element 51 over the full range of the reciprocal transmission ratio irez of the transmission 3, for example to the maximum value of the input rotational speed of the transmission 3, in order to avoid an undesired power limitation at low reciprocal transmission ratios irez of the transmission 3. Otherwise, with a correspondingly small actuation by the driver of the second control element 51 and in particular with small reciprocal transmission ratios irez the upper characteristic line nmoto can be lowered so as to be able to operate the drive motor 2 in a manner that favors low consumption at low reciprocal transmission ratios irez since then, as is known, only less power has to be provided by the drive motor 2.

INDEXES

1 Vehicle drive-train
2 Drive motor
3 Automatic transmission
4 Reversing transmission
5 Frictional shifting element
6 Frictional shifting element
7 Shaft
8 Drive output
9 Drivable vehicle axle
10 Transmission input shaft
11 Fixed wheel
12 Fixed wheel
13 Auxiliary power takeoff
14 Loose wheel
15 Loose wheel
16 Planetary carrier
17 Loose wheel
18 Double planetary carrier
19 First sun gear
20 Second sun gear
21 Ring gear
22 Shaft
23 First hydraulic unit
24 Hydrostatic unit
25 Fixed wheel
26 Fixed wheel
27 Shaft
28 Second hydraulic unit
29 Frictional shifting element
30 Loose wheel
31 Fixed wheel
32 Fixed wheel
33 Fixed wheel
34 Frictional shifting element
35 Loose wheel
36 Loose wheel
37 Transmission output shaft
38 Adjustable yoke
39, 40 Axis
50 First control element
51 Second control element
52 Third control element
53 Rotational speed range
54 Line
FB1 to FB8 Function block
irez Reciprocal transmission ratio of the transmission
nmot, nmot1 Rotational speed of the drive motor
nmotHT Rotational speed of the drive motor
nmoto Upper characteristic line of the rotational speed of the drive motor nmotu Lower characteristic line of the rotational speed of the drive motor
Δnmot Motor rotational speed increase value
ΔnmotHT Rotational speed change value
% FP Degree of actuation of the first control element

The invention claimed is:

1. A method of operating a vehicle drive-train of a working machine, the working machine having a drive motor, a transmission whose transmission ratio can be varied continuously, a drive output, and a rotational speed of the drive motor being variable by a driver, via a first control element, within a rotational speed range delimited by an upper characteristic line and a lower characteristic line, the method comprising:
the upper and the lower characteristic lines are functions of a reciprocal transmission ratio of the transmission, which corresponds to a quotient of a value of the rotational speed of the drive output and a value of the rotational speed of the drive motor,
adjusting the rotational speed of the drive motor by the driver via the first control element;
influencing the rotational speed via the driver's actuation of a further control element and as a function of an operating condition of the working machine; and
selecting a rotational speed value from a characteristic line which, depending on the operating condition of the working machine, is multiplied by a weighting factor that varies between 0 and 1 as a function of the operating condition of the working machine such that the upper characteristic line is influenced as a function of a weighted rotational speed value.

2. The method according to claim 1, further comprising varying the upper characteristic line by the driver's actuation of the further control element and as a function of the operating condition of the working machine.

3. The method according to claim 1, further comprising varying the rotational speed of the drive motor selected as a function of the actuation of the first control element by the driver's actuation of the further control element and as a function of the operating condition of the working machine.

4. The method according to claim 3, further comprising, depending on the actuation of the further control element, selecting a rotational speed value from a characteristic line, which is multiplied by a weighting factor that varies between 0 and 1 depending on the operating condition of the working machine, and is then added to the rotational speed of the drive motor (2) selected as a function of the actuation of the first control element.

5. The method according to claim 1, further comprising with increasing actuation of the first control element while at the same time the rotational speed of the drive output is low, the weighting factor increases, whereas the weighting factor decreases as the value of the rotational speed of the drive output increases.

6. The method according to claim 1, further comprising the weighting factor decreases with an increasing reciprocal transmission ratio of the transmission.

7. The method according to claim 1, further comprising with increasing swivel angle of a hydraulic adjustment unit of a hydrostatic variator of the transmission, in an area of which the transmission ratio of the transmission can be varied continuously, and a thereby increasing displacement volume of the adjustment unit that can be operated as a motor, the weighting factor decreases.

8. The method according to claim 1, further comprising with an increasing pressure difference between a high-pressure side and a low-pressure side of a hydraulic adjustment unit of a hydrostatic variator of the transmission, in an area of which the transmission ratio of the transmission can be varied continuously, the weighting factor increases.

9. The method according to claim 1, further comprising varying the rotational speed of the drive motor selected as a function of the actuation of the first control element and of the further control element as well as of the operating condition of the working machine, as a function of an actuation of an additional control element.

10. The method according to claim 9, further comprising, depending on the actuation of the additional control element, selecting a rotational speed change value, which is added to the rotational speed of the drive motor determined as a function of the actuation of the first control element and of the further control element as well as of the operating condition of the working machine.

11. The method according to claim 9, further comprising:
depending on the actuation of the additional control element, selecting a rotational speed value, and
determining in each case a maximum of the rotational speed value selected as a function of the actuation of the additional control element and the rotational speed determined as a function of the actuation of the first control element and of the further control element as well as of the operating condition of the working machine,
the maximum in each case corresponds to the rotational speed value of the rotational speed of the drive motor determined as a function of the actuation of the additional control element.

12. The method according to claim 9, further comprising limiting the rotational speed of the drive motor, determined in each case as a function of actuation of the additional control element, to a maximum permissible value of the input rotational speed of the transmission.

13. A method of operating a vehicle drive-train of a working machine, the working machine having a drive motor, a transmission with a transmission ratio that is continuously variable, and a drive output, the method comprising:
varying a rotational speed of the drive motor, within a rotational speed range, by actuating a first control element, and delimiting the rotational speed range by an upper characteristic line and a lower characteristic line;
defining both the upper and the lower characteristic lines as functions of a reciprocal transmission ratio of the transmission, which corresponds to a quotient of a value of the rotational speed of the drive output and a value of the rotational speed of the drive motor;
varying the rotational speed of the drive motor; and
varying the upper characteristic line by actuating a further control element and as a function of an operating condition of the working machine.

14. A method of operating a vehicle drive-train of a working machine, the working machine having a drive motor, a transmission which can be varied continuously, a drive output, and a rotational speed of the drive motor being variable by a driver, via a first control element, within a rotational speed range delimited by an upper characteristic line and a lower characteristic line, where the upper and the lower characteristic lines are functions of a reciprocal transmission ratio of the transmission, which corresponds to a quotient of a value of the rotational speed of the drive output and a value of the rotational speed of the drive motor, the method comprising:

adjusting, by the driver via the first control element, the rotational speed of the drive motor within the upper characteristic line and the lower characteristic line; and influencing the rotational speed and varying the upper characteristic line via the driver's actuation of a further control element and as a function of an operating condition of the working machine.

* * * * *